United States Patent
Kurosawa (10) Patent No.: US 8,428,148 B2
(45) Date of Patent: Apr. 23, 2013

(54) SYSTEM AND METHOD FOR CONTROLLING BIT RATE OF VIDEO SIGNAL AND AUDIO SIGNAL

(75) Inventor: Naoki Kurosawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1221 days.

(21) Appl. No.: 12/021,600

(22) Filed: Jan. 29, 2008

(65) Prior Publication Data

US 2008/0187054 A1    Aug. 7, 2008

(30) Foreign Application Priority Data

Feb. 1, 2007   (JP) .................................. 2007/22909

(51) Int. Cl.
H04N 11/02 (2006.01)
(52) U.S. Cl.
USPC .................................................... 375/240.26
(58) Field of Classification Search .......... 370/537–538; 375/240.01–240.29; 725/117–118
See application file for complete search history.

(56) References Cited

U.S. PATENT DOCUMENTS

| | | | |
|---|---|---|---|
| 5,231,492 A | 7/1993 | Dangi et al. | |
| 5,309,290 A | 5/1994 | Sugiyama | |
| 6,628,677 B1 | 9/2003 | Kobayashi | |
| 7,013,077 B2 * | 3/2006 | Honjo | 386/235 |
| 7,035,296 B2 * | 4/2006 | Fujita | 370/538 |
| 2005/0010960 A1 * | 1/2005 | Kitazawa et al. | 725/117 |
| 2006/0215760 A1 | 9/2006 | Monaco | |
| 2007/0263072 A1 * | 11/2007 | Lochbaum et al. | 348/14.08 |

FOREIGN PATENT DOCUMENTS

| | | |
|---|---|---|
| EP | 0784409 A | 7/1997 |
| JP | 07-202820 A | 8/1995 |
| JP | 2002057638 A | 2/2002 |

OTHER PUBLICATIONS

European Search Report for EP 08 25 0329 completed Feb. 25, 2010.

* cited by examiner

*Primary Examiner* — Michael Thier
*Assistant Examiner* — Feben M Haile (57) ABSTRACT

A video and audio bit rate control system which controls a bit rate of a video signal and an audio signal input from a plurality of information sources is provided. The system includes a plurality of encoders for encoding the video signal and the audio signal, an encoder controller for controlling an audio bit rate used in each of encoders, and a statistical multiplex controller for controlling a video bit rate used in each of encoders. The encoder outputs a degree of difficulty in encoding the video signal based on an amount of the video signals. The encoder controller outputs a differential bit rate between a reserved audio bit rate and a total audio bit rate currently used when the total audio bit rate currently used is lower than the reserved audio bit rate. The statistical multiplex controller calculates the video bit rate for assigning to each of encoder based on the differential bit rate, an originally assigned video bit rate and the degree of difficulty in encoding.

10 Claims, 5 Drawing Sheets

SYSTEM AND METHOD FOR CONTROLLING BIT RATE OF VIDEO SIGNAL AND AUDIO SIGNAL

INCORPORATION BY REFERENCE

This application is based upon and claims the benefit of priority from Japanese Patent Application No. JP 2007-022909, filed on Feb. 1, 2007, the disclosure of which is incorporated herein in its entirety by reference.

BACKGROUND OF THE INVENTION

1. Technical Field

The present invention relates to a system and a method for controlling bit rate of a video signal and an audio signal.

2. Background Art

A video and audio bit rate control system has been developed. The system receives a video signal and an audio signal such as a movie and news from a broadcasting station, converts the signals into a form applicable to a digital television set in home, and performs signal multiplexing control of these converted signals by statistical multiplexing scheme for transmitting to the digital television sets in home.

The video and audio bit rate control system includes an encoder which encodes the video signal and the audio signal such as a movie and news.

A bit rate of signal to be encoded is assigned to the encoder according to a type of signals such as the video signal, the audio signal and the other data signal. Here, the bit rate corresponding to each signal is called as a video bit rate, an audio bit rate or the other data bit rate. The variable biterate is assigned for the video signal, and the fixed bit rate is assigned for the audio signal in advance. The above mentioned "bit rate to be assigned" means "a bit rate which the encoder can output", that is, a maximum bit rate which the encoder may output. Accordingly, a total of the video bit rate, the audio bit rate and the other data signal bit rate corresponds to a maximum total bit rate which the encoder may output. The encoder encodes each of the video signal, the audio signal and other data signal so as not to exceed each maximum bit rate which corresponds to each assigned bit rate according to a type of the signals.

Moreover, the encoder encodes the audio signal so that the bit rate of the encoded audio signal may not exceed the audio bit rate variably instructed by an encoder control device which controls the encoder.

Thus, the encoder does not use up a biterate which is reserved as the audio bit rate in advance, when the audio bit rate instructed by the encoder control device is lower than the audio bit rate which is assigned fixedly in advance (i.e. maximum available bit rate). As a result, the bit rate which is not used up is wasted.

Figure 6:
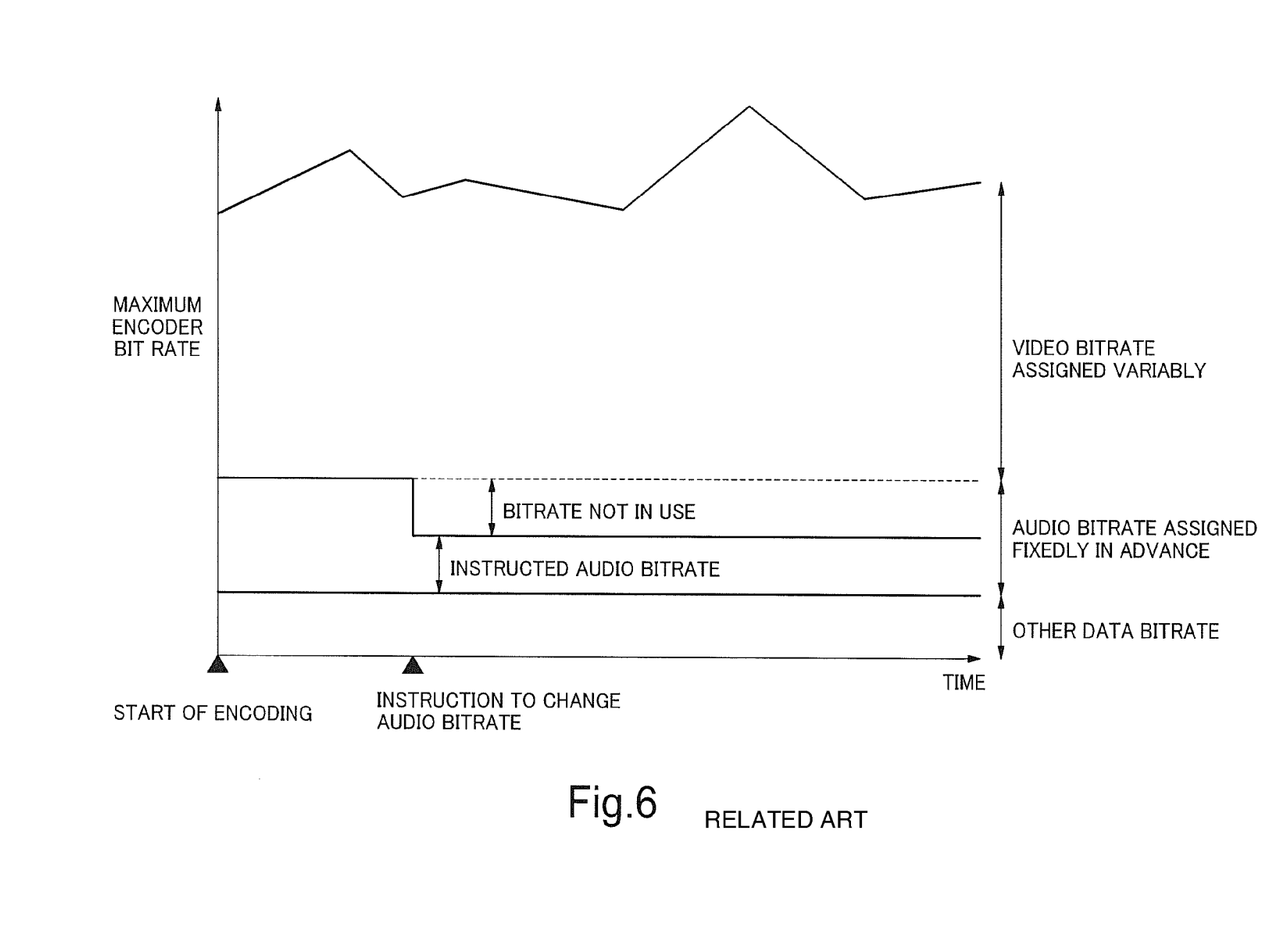
FIG. 6 is a schematic diagram showing an example of time variation of bit rates which are assigned to the encoder.

Above situation will be explained in the following, with reference to FIG. 6. FIG. 6 is a schematic diagram showing an example of time variation of the video bit rate and the audio bit rate which are assigned to the encoder in the above mentioned video and audio bit rate control system. Moreover, FIG. 6 also shows the other data bit rate which is assigned fixedly.

A horizontal axis of FIG. 6 indicates time course. A vertical axis of FIG. 6 indicates the bit rate to be handled by the encoder. As shown in FIG. 6, the video bit rate is assigned variably, the audio bit rate is assigned fixedly and the other data bit rate is assigned fixedly, and a total addition of these bit rates corresponds to a maximum encoder bit rate which the encoder can output. In these circumstances, the encoder performs each encoding of the video signal, the audio signal and the other data signal using respective assigned bit rates. When, at a time point indicated by "INSTRUCTION TO CHANGE AUDIO BITRARE" in FIG. 6, the encoder control device instructs to change the bit rate for encoding the audio signal using a new bit rate which is lower than the pre-assigned bit rate up to that time, the encoder commences the encoding of the audio signal using the new bit rate instructed by the encoder control device from that time point.

Although the new bit rate for encoding the audio signal is lower than the pre-assigned bit rate which is reserved for the audio signal, the encoder encodes the video signal and the other data signal in a similar way as before. This means that the encoder does not use the bit rate corresponding to a difference between the new bit rate and the pre-assigned bit rate, and this unused bit rate is wasted.

Japanese Patent Application Laid-Open No. 1995-202820 discloses a bit rate control system which controls a bit rate dynamically. The system includes an audio encoder, a video encoder, a bit rate assigning device, a FIFO buffer and a system multiplex device. The audio encoder encodes an audio signal and outputs an encoded audio signal bit stream. Moreover, the audio encoder outputs a total bit number saved by the audio encoder. The video encoder receives a video signal, encodes the input video sequence at a rate of fixed number of video units every second and outputs a video bit stream. The bit rate assigning device dynamically assigns a total of bits, which is usable to encode the present video signal, to the video encoder using all the bit number saved by the audio encoder. The FIFO buffer buffers the encoded audio bit stream and the encoded video bit stream and outputs the audio bit stream and the video bit stream at a constant bit rate. The system multiplex device multiplexes the audio bit stream and the video bit stream which are output by the FIFO buffer.

As mentioned above, the bit rate control system described in Japanese Patent Application Laid-Open No. 1995-202820 adopts a single encoder (voice encoder and video encoder). The single encoder dynamically assigns the saved bit rate out of the assigned audio bit rate to the video signal.

Japanese Patent Application Laid-Open No. 2002-057638 discloses a multiplex apparatus which processes a plurality of video signals and a plurality of audio signals which are inputted thereto. The multiplex apparatus described in Japanese Patent Application Laid-Open No. 2002-057638 includes a source encoding unit, a priority decision unit and a media multiplex unit. The source encoding unit includes a plurality of video encoders, audio encoders and data encoders. The source encoder receives a media signal. The media signal includes a plurality of video signals, a plurality of audio signals, various data signals and contents information which indicates contents of each signal. Each encoder, which is included in the source encoding unit, encodes the video signal, the audio signal and various data signals to output an encoded video bit stream, an encoded audio bit stream or an encoded data bit stream. The priority decision unit decides priority of the media signal based on the contents information, which is included in the media signal received by the source encoding unit, with reference to order which is decided in advance according to the signal contents. The media multiplex unit multiplexes each encoded bit stream which the source encoding unit outputs according to the priority of media information.

The multiplex apparatus described in Japanese Patent Application Laid-Open No. 2002-057638 encodes a plurality of video signals, a plurality of audio signals and various data signals, and outputs respective encoded bit streams. As the multiplex scheme, the media multiplex unit multiplexes each encoded bit stream according to the order of priority which is decided in advance based on the contents of the signals.

SUMMARY

An exemplary object of the invention is to provide a video and audio bit rate control system and a method for controlling bit rate of the video signal and the audio signal, that can assign an adequate bit rate effectively and easily to video signals and audio signals which are inputted from a plurality of information sources.

In an exemplary aspect of the invention, a video and audio bit rate control system which controls a bit rate of a video signal and an audio signal input from a plurality of information sources includes a plurality of encoders for encoding the video signal and the audio signal received from the plurality of information sources respectively at an instructed bit rate, an encoder controller for controlling an audio bit rate which is currently used in each of encoders, and a statistical multiplex controller for controlling a video bit rate which is to be used in each of encoders.

The encoder outputs a degree of difficulty in encoding the video signal based on an amount of information on the video signal.

The encoder controller instructs the audio bit rate to each of encoders, and outputs a differential bit rate between the audio bit rate assigned fixedly in advance and a total audio bit rate currently used in each of encoders when the total audio bit rate currently used is lower than the audio bit rate assigned fixedly.

The statistical multiplex controller receives the differential bit rate from the encoder controller and the degree of difficulty in encoding from each of the plurality of encoders, calculates a video bit rate for assigning to each of encoders based on the differential bit rate, an originally assigned video bit rate for encoding the video signal and the degree of difficulty in encoding, and instructs the calculated video bit rate to each of the encoders for encoding the video signal.

In other exemplary aspect of the invention, a video and audio bit rate control method for controlling a bit rate of a video signal and an audio signal input from a plurality of information sources by a plurality of encoders, includes: calculating a degree of difficulty in encoding the video signal based on an amount of information on the video signal in each of the plurality of encoders; calculating a total audio bit rate currently used in each of the encoders for encoding the audio signal; calculating a differential bit rate between an audio bit rate assigned fixedly in advance and the total audio bit rate currently used in each of the encoders when the total audio bit rate currently used in each of the encoders is lower than the audio bit rate assigned fixedly in advance; calculating a video bit rate for assigning to each of encoders based on the differential bit rate, an originally assigned video bit rate for encoding the video signal and the degree of difficulty in encoding; and instructing the calculated video bit rate to each of the encoders for encoding the video signal in the plurality of encoders respectively.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will now be described in detail in accordance with the accompanying drawings.

Figure 1:
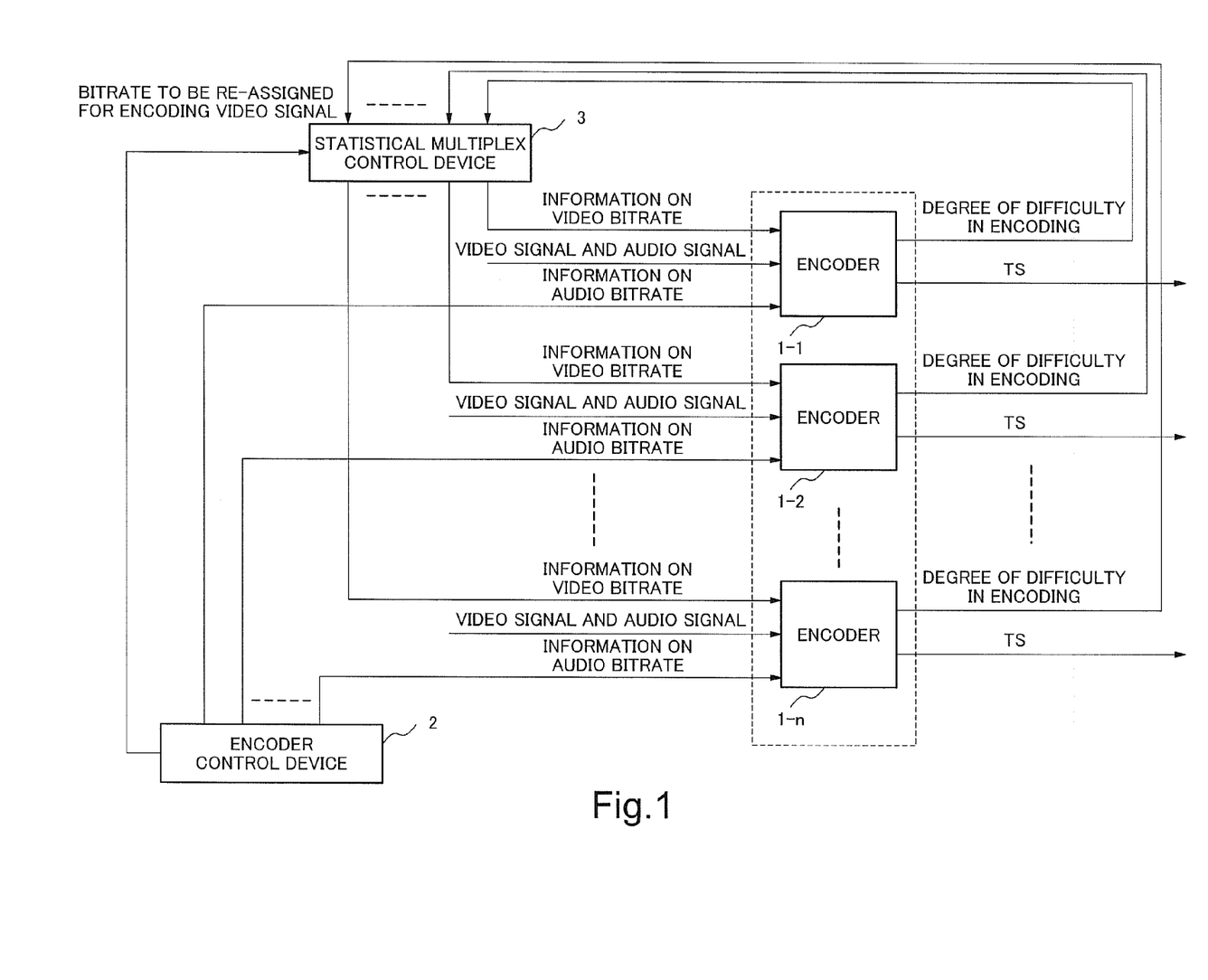
FIG. 1 shows a video and audio bit rate control system according to an exemplary embodiment of the present invention.

FIG. 1 shows a video and audio bit rate control system according to an exemplary embodiment of the present invention.

The video and audio bit rate control system shown in FIG. 1 includes a plurality of encoders, that is, n encoders 1-1 to 1-n (n is an integer larger than 1), an encoder control device 2 and a statistical multiplex control device 3 according to the exemplary embodiment of the present invention.

Each of a plurality of encoders 1-1 to 1-n receives a video signal and an audio signal such as a movie and news from a broadcasting station, and encodes the signals. The encoders 1-1 to 1-n encode the video signal and the audio signal based on information on a video bit rate, which specifies a maximum bit rate of the encoded video signal and information on an audio bit rate which specifies a maximum bit rate of the encoded audio signal. That is, each of the encoders 1-1 to 1-n encodes the video signal so that a bit rate of encoded video signal may not exceed a bit rate specified by information on the video bit rate. Furthermore, each of the encoders 1-1 to 1-n encodes the audio signal so that a bit rate of encoded audio signal may not exceed a bit rate specified by information on the audio bit rate. The information on the video bit rate is provided by the statistical multiplex control device 3. The information on the audio bit rate is provided by the encoder control device 2. Each of the plurality of encoders 1-1 to 1-n encodes the video signal and the audio signal according to, for example, MPEG 2 (Moving Picture Experts Group phase 2) method, which is a method for encoding a video signal and an audio signal. Then, each of the plurality of encoders 1-1 to 1-n outputs the encoded video signal and the encoded audio signal as a transport stream (Hereinafter, referred to as TS). TS means a data format which is standardized in MPEG2 (Moving Picture Experts Group phase 2) specification and is able to multiplex a plurality of encoded video signals, encoded audio signals and other data. A transport stream multiplex device (Hereinafter, referred to as TS MUX, not illustrated) multiplexes respective TSs outputted from the encoders 1-1 to 1-n, and then outputs the multiplex signal as TSm. TS MUX outputs TSm to a transmission line. At this time, bit rate of each signal (the video signal, the audio signal and other data) included in TSm is assigned fixedly in advance so that bit rate of TSm may not exceed bit rate of the transmission line. For example, bit rate of 20 Mbps (bit per second), 8 Mbps and 2 Mbps are assigned to the video signal, the audio signal and other data respectively, when bit rate of the transmission line is 30 Mbps.

The plurality of encoders 1-1 to 1-n calculate a degree of difficulty in encoding the video signal based on an amount of information on the inputted video signal, and output the calculated degree of difficulty in encoding to the statistical multiplex control device 3. Here, the amount of information on the video signal means the number of change in a space-time domain in the video signal. Therefore, the video signal which frequently changes in the space-time domain includes a large amount of information. For example, an image in which an object having a complicated color and a complicated shape moves at random includes a large amount of information, and an image in which an inactive object with a mono tone includes a small amount of information. Moreover, when the video signal includes a large amount of information, the bit rate of the encoded video signal becomes high. Therefore, the bit rate of the encoded video signal is proportional approximately to an amount of information on the video signal. Thus, the video signal including a high encoded bit rate includes severe difficulty in encoding the video signal. Accordingly, the degree of difficulty in encoding the video signal is proportional approximately to the bit rate of the video signal which encoder outputs.

The encoder control device 2 outputs the information on the audio bit rate which specifies the maximum bit rate of the encoded audio signal to each of the plurality of encoders 1-1 to 1-n. Then, according to the information on the audio bit rate, the encoder control device 2 controls the bit rate of the encoded audio signal which each of the encoders 1-1 to 1-n outputs.

Furthermore, the encoder control device 2 calculates a differential bit rate between a total of each audio bit rate which is specified by the information on the audio bit rate for each of encoders 1-1 to 1-n and a reserved audio bit rate which is the fixed bit rate assigned to the audio signal in advance. Then, the encoder control device 2 transfers the differential bit rate to the statistical multiplex control device 3 in order to re-assign the differential bit rate for the video signal.

The statistical multiplex control device 3 uses the differential bit rate for a bit rate to be assigned for the video signal in addition to an original bit rate assigned for the video signal, and the statistical multiplex control device 3 divides the total bit rate (the differential bit rate and the original bit rate) assigned for the video signal and assigns to each of the encoders 1-1 to 1-n based on the degree of difficulty in encoding. Then, the statistical multiplex control device 3 provides the assigned video bit rate information to each of the encoders 1-1 to 1-n.

As described above, the unused bit rate for the audio signal is reused for assigning the bit rate for the video signal.

Figure 2:
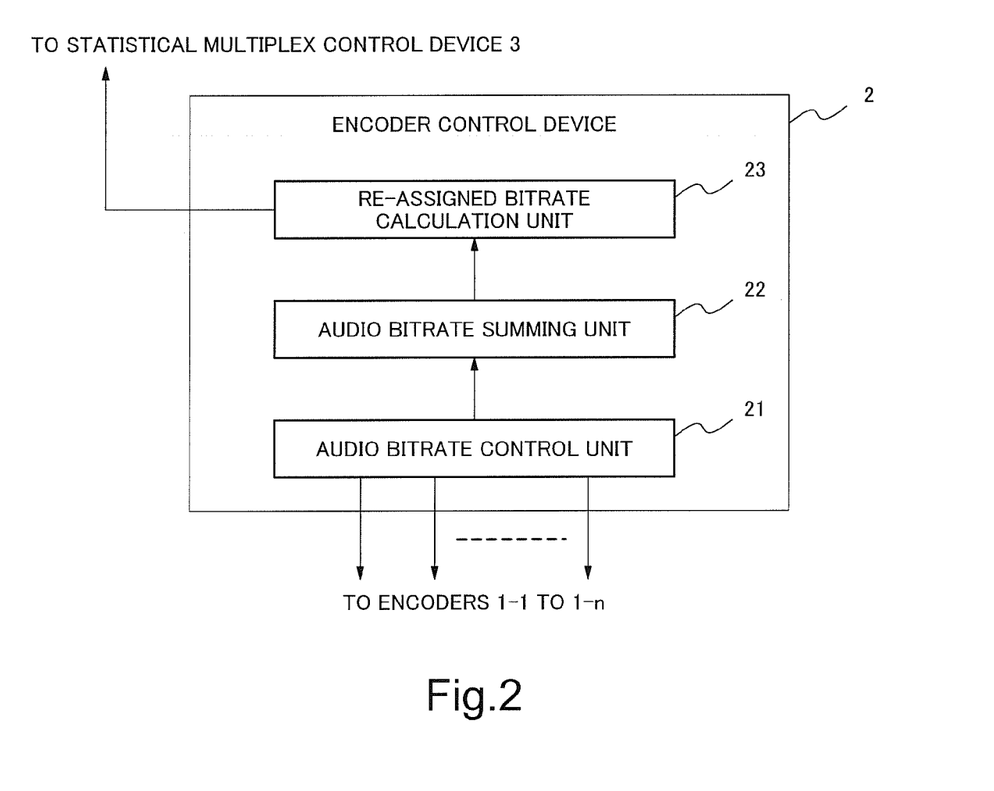
FIG. 2 shows an example of an encoder control device.

FIG. 2 shows an example of the encoder control device.

The encoder control device 2 includes an audio bit rate control unit 21, an audio bit rate summing unit 22 and a re-assigned bit rate calculation unit 23.

Moreover, the encoder control device 2 includes a program-audio bit rate table which indicates the audio bit rate corresponding to various broadcasting programs in advance. For example, a movie corresponds to an audio bit rate of 384 kbps, and news corresponds to an audio bit rate of 128 kbps. Furthermore, the encoder control device 2 includes also an audio bit rate information table indicating present audio bit rate information which is currently provided to each of the encoders 1-1 to 1-n.

When an upper hierarchy apparatus such as a broadcasting station provides an instruction for changing over a broadcasting program and information on a kind of next program to a certain subsystem (for example, a subsystem corresponding to the nth encoder), the audio bit rate control unit 21 in the encoder control device 2 receives the instruction and the information. Then the audio bit rate control unit 21 retrieves the audio bit rate, which is corresponding to the kind of the broadcasting program indicated by the received information, from the program-audio bit rate table, and provides the corresponding encoder of the subsystem (the nth encoder) with the retrieved audio bit rate as the information on the audio bit rate. Then, the audio bit rate control unit 21 updates the audio bit rate information table so as to associate the retrieved audio bit rate with the nth encoder for indicating that the nth encoder is currently using the retrieved audio bitorate. The audio bit rate summing unit 22 sums up each of the audio bit rates currently being instructed to each of the encoders 1-1 to 1-n by reference to the updated audio bit rate information table. Summation thereof is corresponding to the total biterates which the encoders 1-1 to 1-n are currently using for encoding the audio signal. The re-assigned bit rate calculation unit 23 calculates a bit rate to be re-assigned for the video signal based on the differential bit rate between the total bit rates calculated by the audio bit rate summing unit 22 and the reserved audio bit rate which is assigned fixedly in advance.

That is, when the total bit rates calculated by the audio bit rate summing unit 22 is lower than the reserved audio bit rate which is assigned fixedly in advance, the re-assigned bit rate calculation unit 23 calculates the differential bit rate and outputs the differential bit rate to the statistical multiplex control unit 3 as the bit rate to be re-assigned.

Figure 3:
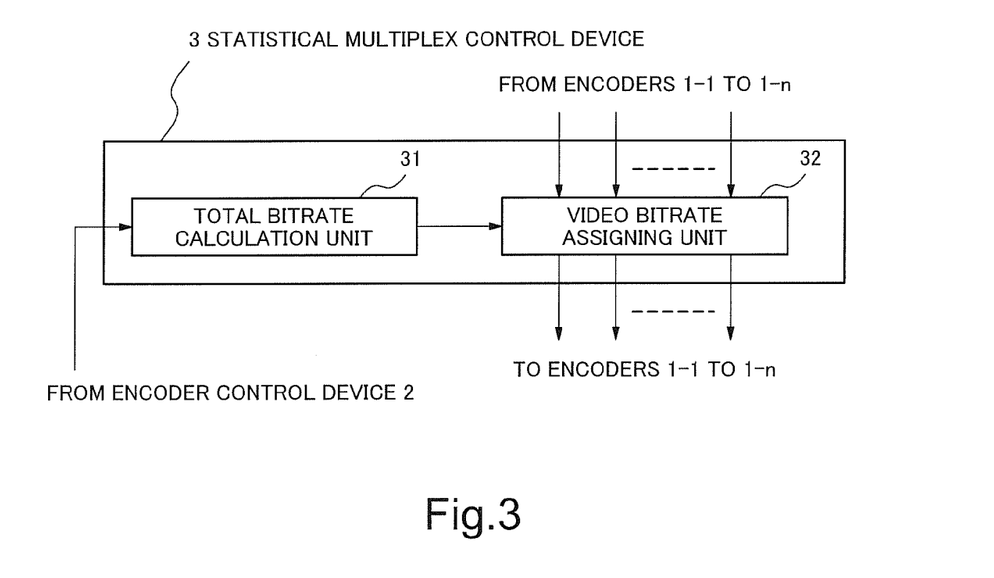
FIG. 3 shows an example of a statistical multiplex control device.

FIG. 3 shows an example of the statistical multiplex control device.

The statistical multiplex control device 3 includes a total bit rate calculation unit 31 and a video bit rate assigning unit 32.

The total bit rate calculation unit 31 adds the bit rate to be re-assigned which the encoder control device 2 outputs and the video bit rate which is assigned originally in advance, to calculate a total bit rate which can be used for the video signal.

The video bit rate assigning unit 32 divides the total bit rate and assigns to each of the encoders 1-1 to 1-n according to the degree of the encoding difficulty outputted by each of the encoders 1-1 to 1-n. That is, the video bit rate assigning unit 32 assigns broad bit rate to the encoder which encounters severe difficulty in encoding, when dividing the total bit rate which the total bit rate calculation unit 31 calculates. Then, the video bit rate assigning unit 32 provides the encoders 1-1 to 1-n with the video biterates assigned to the encoders 1-1 to 1-n respectively, as the information on the video bit rate.

Next, an operation of the video and audio bit rate control system according to the exemplary embodiment of the present invention will be described in detail with reference to FIG. 2 to FIG. 5.

Figure 4:
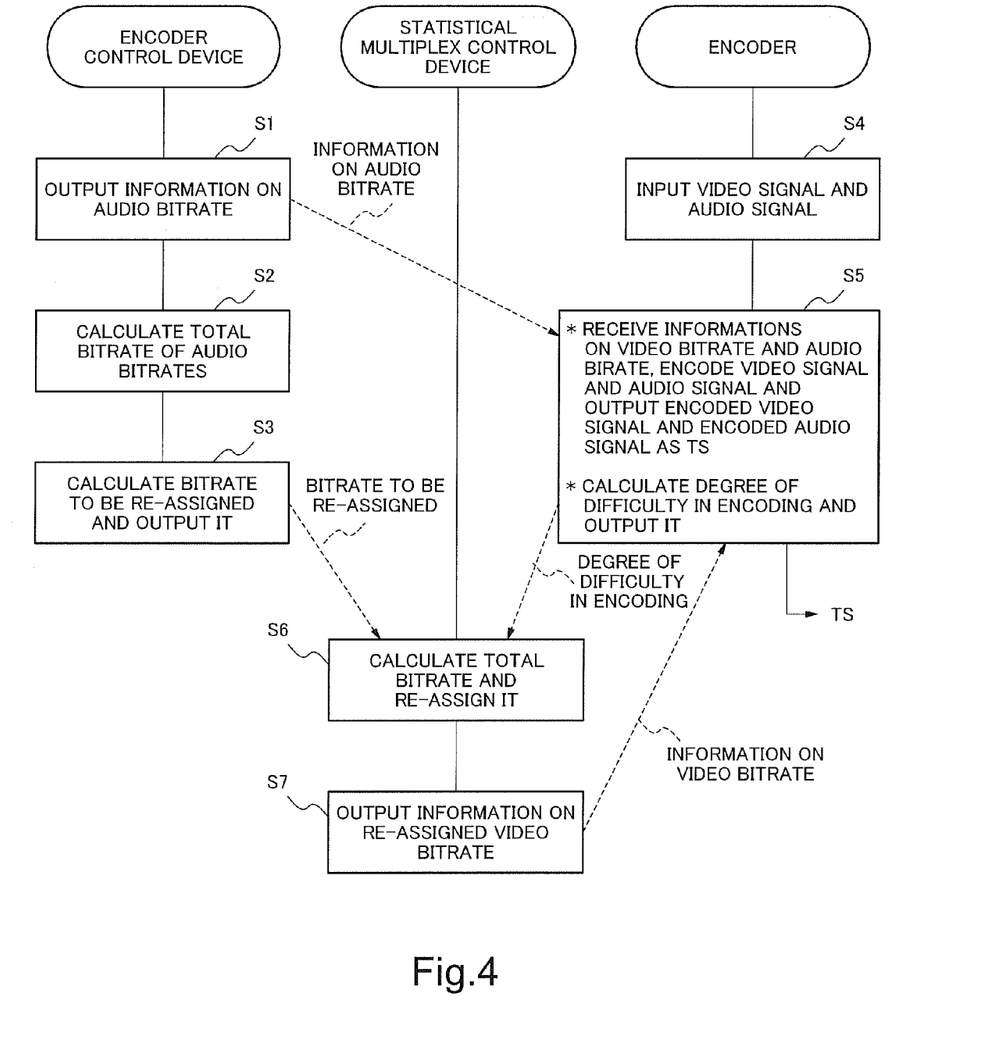
FIG. 4 is a flowchart showing an example of an operation of an encoder of the video and audio bit rate control system according to the exemplary embodiment of the present invention.

FIG. 4 is a flowchart showing an example of an operation of the video and audio bit rate control system according to the exemplary embodiment of the present invention;

In step 1 (S1) of FIG. 4, the audio bit rate control unit 21 of the encoder control device 2 outputs each of the audio bit rates to each of the encoders 1-1 to 1-n respectively as information on the audio bit rate. Each audio bit rate corresponds to an initial value which is set in the audio bit rate information table in advance. The audio bit rate control unit 21 receives the instruction from the upper hierarchy apparatus such as a broadcasting station to a certain subsystem of the video and audio bit rate control system (For example, a subsystem corresponding to the nth encoder) to change over the broadcasting program to next one, and receives information on the kind of next broadcasting program. The audio bit rate control unit 21 retrieves the audio bit rate, which is corresponding to the kind of broadcasting program indicated by the received information, from the program-the audio bit rate table, and provides the corresponding encoder of the subsystem (nth encoder) with the retrieved audio bit rate as the information on the audio bit rate. Then, the audio bit rate control unit 21 updates the audio bit rate information table so as to associate the information on the audio bit rate with the nth encoder.

In step 2 (S2) in FIG. 4, the audio bit rate summing unit 22 sums up each of the audio bit rates currently being used which are indicated in the updated audio bit rate information table. The whole sum of the audio bit rates is corresponding to the total biterates which the encoders 1-1 to 1-n are currently using for encoding the audio signals.

In step 3 (S3) of FIG. 4, the re-assigned bit rate calculation unit 23 of the encoder control device 2 calculates the bit rate to be re-assigned usable for the video signal based on the total bit rates calculated by the audio bit rate summing unit 22 and the reserved audio bit rate which is assigned fixedly in advance. That is, when the total bit rates calculated by the audio bit rate summing unit 22 is lower than the whole sum of the reserved audio bit rates which are assigned to the encoders 1-1 to 1-n fixedly in advance, the re-assigned bit rate calculation unit 23 calculates the differential bit rate therebetween and outputs the differential bit rate to the statistical multiplex control device 3 as the bit rate to be re-assigned.

In Step 4 (S4) of FIG. 4, each of the encoders 1-1 to 1-n receives a video signal and an audio signal such as a movie and news program from the broadcasting station.

In Step 5 (S5) of FIG. 4, each of the encoders 1-1 to 1-n receives the information on the video bit rate from the statistical multiplex control device 3 and receives the information on the audio bit rate from the encoder control device 2. Then, each of the encoders 1-1 to 1-n encodes the video signal so that the bit rate of the encoded video signal may not exceed the bit rate in the information on the video bit rate. Furthermore, each of the encoders 1-1 to 1-n encodes the audio signal so that the bit rate of the encoded audio signal may not exceed the bit rate in the information on the audio bit rate. Then, each of the encoders 1-1 to 1-n outputs the encoded video signal and the encoded audio signal as TS to TS MUX (not illustrated). Moreover, each of the encoders 1-1 to 1-n decides the degree of encoding difficulty out of, for example, degrees 1 to 5, based on the bit rate of the encoded video signal which is proportional approximately to the amount of information on the inputted video signal. A large number in the degree 1 to 5 means that the degree of difficulty in encoding is high. While the bit rate of the encoded video signal is divided into 5 ranks of degree of difficulty in encoding, any number of ranks may be allowable. Each of the encoders 1-1 to 1-n outputs the degree of difficulty in encoding to the statistical multiplex control device 3.

In Step 6 (S6) of FIG. 4, the total bit rate calculation unit 31 of the statistical multiplex control device 3 adds the bit rate to be re-assigned which the encoder control device 2 outputs and the video bit rate which is assigned originally in advance to calculate the total bit rate.

The video bit rate assigning unit 32 of the statistical multiplex control device 3 divides the total bit rate and assigns to each of the encoders 1-1 to 1-n according to the degree of difficulty in encoding which is outputted by each of the encoders 1-1 to 1-n.

That is, the video bit rate assigning unit 32 uses the rank of degree of difficulty in encoding (for example, degree 1 to degree 5) for assigning the bit rate to each of encoders 1-1 to 1-n, and the video bit rate assigning unit 32 assigns a higher bit rate to the encoder which outputs a higher rank of degree of difficulty. In this assignment, a method by way of proportional assignment according to the rank of degrees may be used.

In Step 7 (S7) of FIG. 4, the video bit rate assigning unit 32 provides each of the encoders 1-1 to 1-n with the video biterates assigned to each of the encoders 1-1 to 1-n respectively, as the information on the video bit rate.

Figure 5:
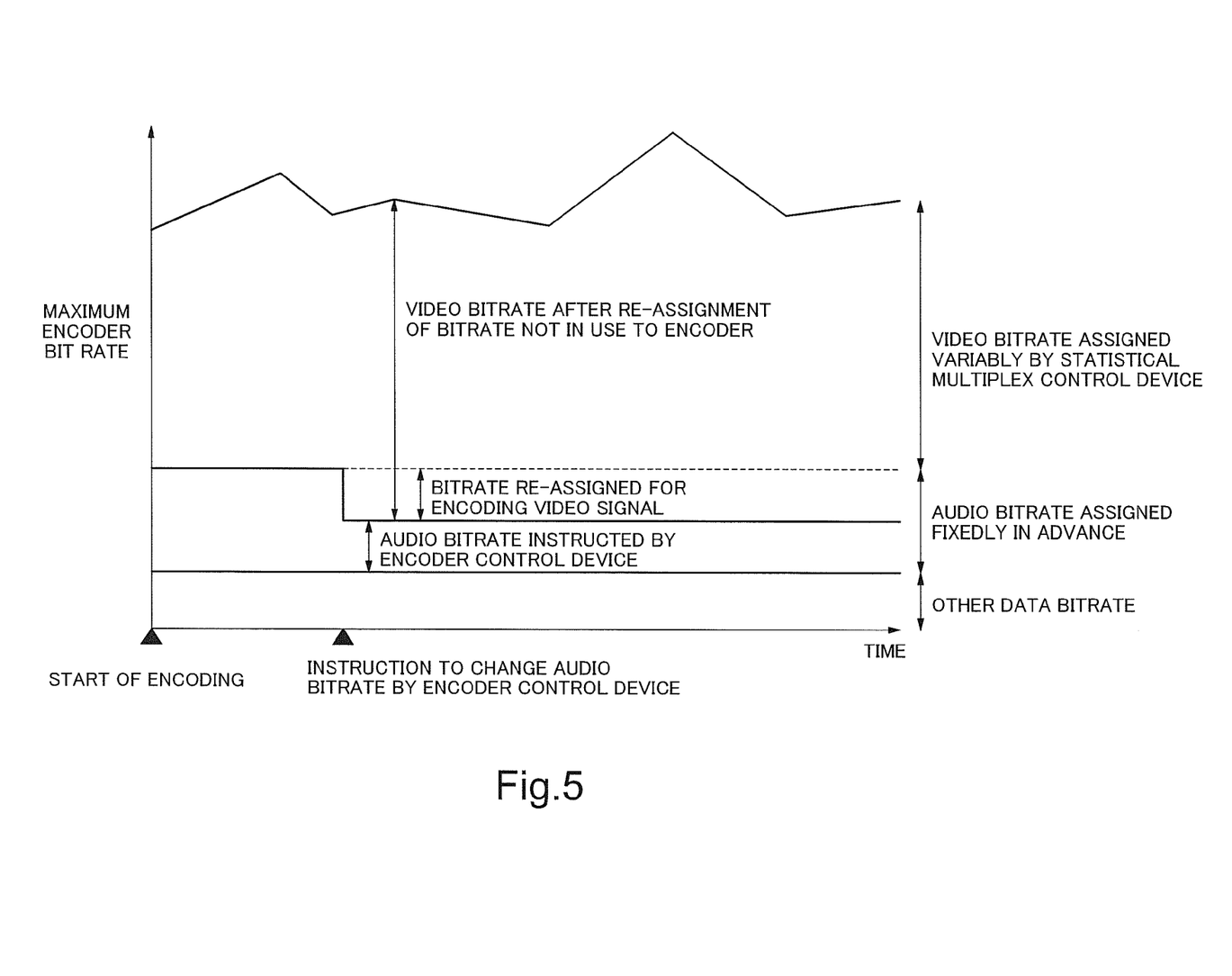
FIG. 5 is a schematic diagram showing an example of time variation of bit rates which are assigned to a video signal and a audio signal in the video and audio bit rate control system according to the exemplary embodiment of the present invention.

Outline of the described above will be described below with reference to FIG. 5. FIG. 5 is a schematic diagram showing an example of time variation of the video bit rate and the audio bit rate to be assigned to an encoder in the video and audio bit rate control system according to the exemplary embodiment of the present invention. Moreover, FIG. 5 also shows the other data bit rate which is assigned fixedly.

The horizontal axis in FIG. 5 indicates time course. The vertical axis of FIG. 5 indicates each of the bit rates for the video signal, the audio signal and the other data assigned to the encoder. As shown in FIG. 5, a total addition of these bit rates corresponds to a maximum encoder bit rate which the encoder can output.

With reference to FIG. 5, during a period from starting encoding to receiving an instruction to change the audio bit rate from the encoder control device 2, each of the audio signal and the other data is encoded at the bit rate which is assigned to the encoder originally in advance. During the period, the audio bit rate instructed by the encoder control device 2 is the same as the bit rate which is assigned fixedly for the audio signal in advance. Thus, there is no bit rate to be re-assigned to the video signal during the period. Accordingly, during the period, the statistical multiplex control device 3 variably assigns a bit rate for the video signal by only using the bit rate assigned originally in advance for encoding the video signal according to the degree of difficulty in encoding.

After the encoder control device 2 instructs the encoder to change the audio bit rate, the other data are encoded in a similar way as before the instruction to change the audio bit rate. Meanwhile, after the instruction to change the audio bit rate, the audio bit rate becomes lower than the bit rate which is assigned fixedly in advance to the encoder. The encoder does not use the differential bit rate between these bit rates for encoding the audio signal. According to the exemplary embodiment of the present invention, the video and audio bit rate control system re-assigns, for encoding the video signal, the differential bit rate which is not used.

In the above-mentioned description, a video signal and an audio signal encoding method of the encoders 1-1 to 1-n adopts MPEG 2 method, but may adopt MPEG method instead of MPEG 2. Moreover, a video signal encoding method of the encoders 1-1 to 1-n may adopt H.264. Further, H.264 is an international recommendation by ITU (International Telecommunication Union) with regard to a method for compression encoding of motion picture data.

In the above-mentioned description, the encoder control device 2 instructs the encoder to change the audio bit rate. Television signal is usable when a video signal received by the encoder is a television signal. That is, the television signal can include information other than the video signal, in an area (That is, ancillary data area) where is not displayed on a television screen. It may be possible that the ancillary data area includes information on the audio bit rate and each encoder changes the audio bit rate based on information on the audio bit rate in the ancillary data area.

Moreover, in the above-mentioned description, when surplus occurs in the bit rate assigned to the audio signal, the statistical multiplex control unit is supplied temporally with the surplus biterate and re-assigns the surplus bit rate to each encoder. But, the surplus bit rate may be re-assigned to the video signal in the each encoder without outputting the surplus to the statistical multiplex control unit.

Moreover, in the above-mentioned description, when surplus occurs in the bit rate assigned to the audio signal, the surplus bit rate is re-assigned to the video signal. The surplus bit rate may be re-assigned, for example, to the other data, instead of being re-assigned to the video signal.

The related art of Japanese Patent Application Laid-Open No. 1995-202820 described in the background art causes a problem, such as nothing is disclosed how to control a plurality of encoders and how to operate when a plurality of video signals and the audio signals are input although the disclosure describes about dynamic assignment for a saved bit rate, because the disclosure is limited to the system using only a single encoder.

Furthermore, another related art of Japanese Patent Application Laid-Open No. 2002-057638 described in the background art causes a problem, such as an order of priority for multiplexing coded signals should be decided in advance according to the signal contents although the disclosure describes about handling a plurality of video signals, a plurality of audio signals and various data signals, because the multiplex control in this disclosure is performed based on the order of priority which is decided in advance.

An exemplary advantage according to the invention is in the following.

As mentioned above, a plurality of encoders which encode the audio signals and the video signals inputted from a plurality of information sources respectively calculate degrees of difficulty in encoding based on an amount of information on the inputted video signal, according to the exemplary embodiment of the present invention. Then, the encoder control device 2 controls the audio bit rate of the audio signal encoded by the encoder. When the total bit rates to be used for the audio bit rate become lower than the audio bit rate which is assigned fixedly in advance, the encoder control device 2 calculates the differential bit rate therebetween. Then, the statistical multiplex control device 3 calculates the video bit rate of the video signal encoded by the encoder, based on the calculated differential bit rate, the video bit rate assigned to the video signal in advance, and degree of difficulty in encoding.

According to the exemplary embodiment of the present invention, it is possible to assign an suitable bit rate effectively and easily to the video signal and the audio signal which are inputted from a plurality of information sources. Moreover, it is possible to re-assign the surplus bit rate in the audio bit rate assigned fixedly in advance as the video bit rate to increase the video bit rate. Thus, it is possible to prevent the bit rate from being wasted and improve video quality.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. A video and audio bit rate control system which controls a bit rate of a video signal and an audio signal input from a plurality of information sources, comprising:
a plurality of encoders which receives said video signal and said audio signal from said plurality of information sources respectively, wherein said encoder outputs a degree of difficulty in encoding said video signal based on an amount of information on said video signal and encodes said video signal and said audio signal at an instructed video bit rate and an instructed audio bit rate;
an encoder control device which instructs said audio bit rate to each of said encoders for encoding said audio signal in said plurality of encoders respectively, and outputs a differential bit rate between an audio bit rate assigned fixedly in advance and a total audio bit rate instructed to each of said encoders, when said total audio bit rate instructed to each of said encoders is lower than said audio bit rate assigned fixedly in advance; and
a statistical multiplex control device which receives said differential bit rate from said encoder control device and said degree of difficulty in encoding from each of said plurality of encoders, adds said differential bit rate and a video bit rate assigned in advance to obtain a total bit rate, divides the total bit rate to obtain a video bit rate information for assigning to each of encoders, based on said degree of difficulty in encoding, and provides said video bit rate information to each of said encoders for encoding said video signal in said plurality of encoders respectively.

2. The video and audio bit rate control system according to claim 1, wherein said encoder calculates said degree of difficulty in encoding according to an amount of bit rate of encoded video signals.

3. The video and audio bit rate control system according to claim 1, wherein said encoder control device comprising:
an audio bit rate control unit which instructs said audio bit rate to each of said encoders for encoding said audio signal in said plurality of encoders respectively;
an audio bit rate summing unit which calculates said total audio bit rate instructed to each of said encoders; and
a re-assigned bit rate calculating unit which outputs said differential bit rate between said audio bit rate assigned fixedly in advance and said total audio bit rate instructed to each of said encoders, when said total audio bit rate instructed to each of said encoders is lower than said audio bit rate assigned fixedly in advance.

4. The video and audio bit rate control system according to claim 1, wherein said statistical multiplex control device comprising:
a total bit rate calculating unit which calculates a total video bit rate to be assigned by adding said differential bit rate to said originally assigned video bit rate; and
a video bit rate assigning unit which assigns said video bit rate to each of encoders by dividing said total video bit rate based on said degree of difficulty in encoding received from each of said plurality of encoders, and instructing said assigned video bit rate to each of said encoders.

5. The video and audio bit rate control system according to claim 4, wherein said video bit rate assigning unit assigns said video bit rate to each of encoders by dividing said total video bit rate by proportional assignment according to a rank of said degree of difficulty in encoding.

6. A video and audio bit rate control method for controlling a bit rate of a video signal and an audio signal input from a plurality of information sources by a plurality of encoders, comprising:
calculating a degree of difficulty in encoding said video signal based on an amount of information on said video signal in each of said plurality of encoders;
calculating a total audio bit rate currently used in each of said encoders for encoding said audio signal;

calculating a differential bit rate between an audio bit rate assigned fixedly in advance and said total audio bit rate currently used in each of said encoders when said total audio bit rate currently used in each of said encoders is lower than said audio bit rate assigned fixedly in advance;

adding said differential bit rate and a video bit rate assigned in advance to obtain a total bit rate;

dividing the total bit rate to obtain a video bit rate information for assigning to each of encoders, based said degree of difficulty in encoding; and providing said video bit rate information to each of said encoders for encoding said video signal in said plurality of encoders respectively.

7. The video and audio bit rate control method according to claim 6, wherein said degree of difficulty in encoding is calculated according to an amount of bit rate of encoded video signals.

8. The video and audio bit rate control method according to claim 6, wherein said step of calculating the video bit rate for assigning to each of encoders further comprising:

calculating a total video bit rate to be assigned by adding said differential bit rate to said originally assigned video bit rate; and assigning said video bit rate to each of encoders by dividing said total video bit rate based on said degree of difficulty in encoding corresponding to each of said plurality of encoders.

9. The video and audio bit rate control method according to claim 8, wherein said step of assigning said video bit rate to each of encoders is performed by dividing said total video bit rate by proportional assignment according to a rank of said degree of difficulty in encoding.

10. A video and audio bit rate control system which controls a bit rate of a video signal and an audio signal input from a plurality of information sources, comprising:

a plurality of encoding means for receiving said video signal and said audio signal from said plurality of information sources respectively, wherein said encoding means outputs a degree of difficulty in encoding said video signal based on an amount of information on said video signal and encodes said video signal and said audio signal at an instructed video bit rate and an instructed audio bit rate;

an encoder control means for instructing said audio bit rate to each of said encoding means for encoding said audio signal in said plurality of encoding means respectively, and outputting a differential bit rate between an audio bit rate assigned fixedly in advance and a total audio bit rate instructed to each of said encoding means, when said total audio bit rate instructed to each of said encoding means is lower than said audio bit rate assigned fixedly in advance; and a statistical multiplex control means for receiving said differential bit rate from said encoder control means and said degree of difficulty in encoding from each of said plurality of encoding means, adding said differential bit rate and a video bit rate assigned in advance to obtain a total video bit rate, dividing the total bit rate to obtain a video bit rate information for assigning to each of encoding means, based on said degree of difficulty in encoding, and providing said calculated video bit rate information to each of said encoding means for encoding said video signal in said plurality of encoding means respectively.

* * * * *